United States Patent
Nomaru et al.

(10) Patent No.: US 7,675,002 B2
(45) Date of Patent: Mar. 9, 2010

(54) LASER BEAM PROCESSING MACHINE

(75) Inventors: Keiji Nomaru, Tokyo (JP); Yasuomi Kaneuchi, Tokyo (JP); Hiroshi Morikazu, Tokyo (JP)

(73) Assignee: Disco Corporation, Tokyo (JP)

( * ) Notice: Subject to any disclaimer, the term of this patent is extended or adjusted under 35 U.S.C. 154(b) by 55 days.

(21) Appl. No.: 11/635,539

(22) Filed: Dec. 8, 2006

(65) Prior Publication Data

US 2007/0138156 A1 Jun. 21, 2007

(30) Foreign Application Priority Data

Dec. 15, 2005 (JP) ............................. 2005-362236

(51) Int. Cl.
  *B23K 26/38* (2006.01)
  *B23K 26/067* (2006.01)
(52) U.S. Cl. .................. 219/121.7; 219/121.73; 219/121.77
(58) Field of Classification Search ............ 219/121.67, 219/121.73, 121.82, 121.7, 121.71, 121.76, 219/121.77
See application file for complete search history.

(56) References Cited

U.S. PATENT DOCUMENTS

| | | | | |
|---|---|---|---|---|
| 3,399,013 | A * | 8/1968 | Aas et al. .................... 359/310 |
| 4,392,476 | A * | 7/1983 | Gresser et al. ............ 219/121.6 |
| 6,172,330 | B1 * | 1/2001 | Yamamoto et al. ....... 219/121.7 |
| 6,285,002 | B1 * | 9/2001 | Ngoi et al. ............. 219/121.73 |
| 7,531,767 | B2 * | 5/2009 | Arai et al. ................ 219/121.7 |
| 2002/0024007 | A1 * | 2/2002 | Engelhardt et al. .......... 250/234 |
| 2002/0141035 | A1 * | 10/2002 | Davidson et al. ............ 359/285 |
| 2004/0129685 | A1 * | 7/2004 | Arai et al. ................ 219/121.7 |
| 2005/0006358 | A1 * | 1/2005 | Shigematsu et al. .... 219/121.72 |
| 2005/0270630 | A1 * | 12/2005 | Johnson ...................... 359/305 |
| 2006/0028710 | A1 * | 2/2006 | Johnson et al. ............. 359/311 |
| 2006/0201920 | A1 | 9/2006 | Morikazu et al. |
| 2008/0031291 | A1 * | 2/2008 | Kobayashi et al. ..... 372/29.012 |

FOREIGN PATENT DOCUMENTS

| | | | |
|---|---|---|---|
| JP | 55-81095 | A * | 6/1980 |
| JP | 5-169286 | A * | 7/1993 |
| JP | 9-201685 | A * | 8/1997 |
| JP | 10-137960 | A * | 5/1998 |

(Continued)

*Primary Examiner*—Geoffrey S Evans
(74) *Attorney, Agent, or Firm*—Smith, Gambrell & Russell, LLP

(57) ABSTRACT

A laser beam processing machine comprising a chuck table for holding a workpiece, a laser beam application device for applying a laser beam to the workpiece held on the chuck table, a processing-feed device for moving the chuck table and the laser beam application device relative to each other in a processing-feed direction (X-axis direction), and an indexing-feed device for moving the chuck table and the laser beam application device relative to each other in an indexing-feed direction (Y-axis direction) perpendicular to the processing-feed direction (X-axis direction), wherein the laser beam application device includes a laser oscillation device for oscillating a laser beam, a first acousto-optic deflection device for deflecting the optical axis of a laser beam oscillated by the laser beam oscillation device in the processing-feed direction (X-axis direction), and a second acousto-optic deflection device for deflecting the optical axis of a laser beam oscillated by the laser beam oscillation device in the indexing-feed direction (Y-axis direction).

1 Claim, 9 Drawing Sheets

FOREIGN PATENT DOCUMENTS

| | | | | |
|---|---|---|---|---|
| JP | 2000-100608 A | * | 4/2000 | |
| JP | 2002-011588 A | * | 1/2002 | |
| JP | 2003-136270 A | * | 5/2003 | |
| JP | 2004-142082 A | * | 5/2004 | |
| JP | 2004-230441 A | * | 8/2004 | |
| JP | 2005-161327 A | * | 6/2005 | |
| JP | 2006-247674 | | 9/2006 | |

* cited by examiner

Fig. 7
(a)
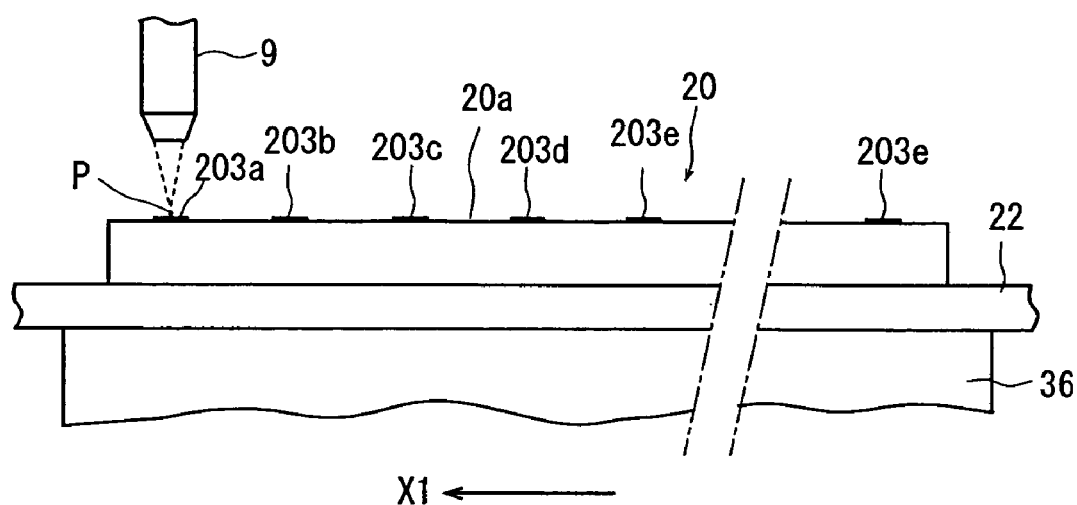
(b)
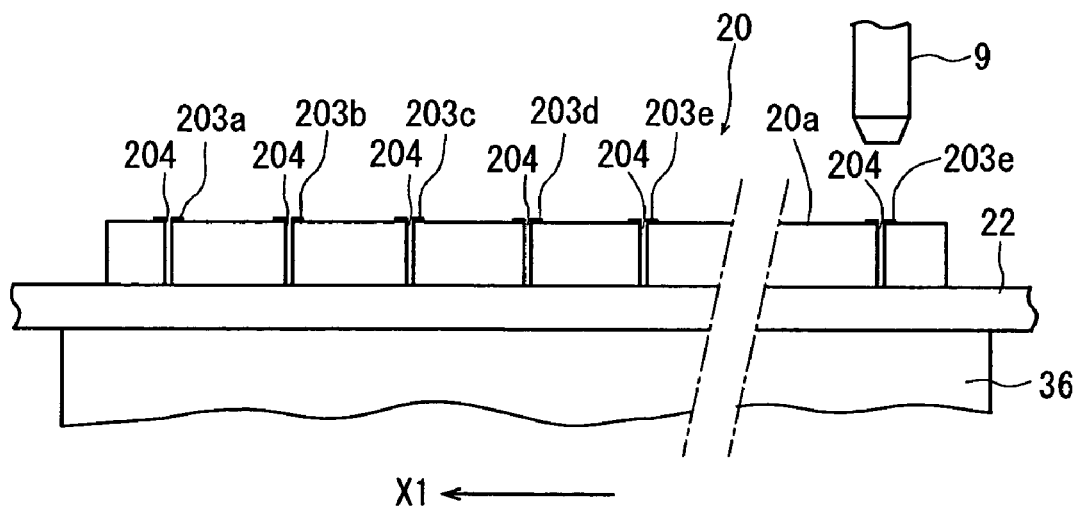

Fig. 8
(a)
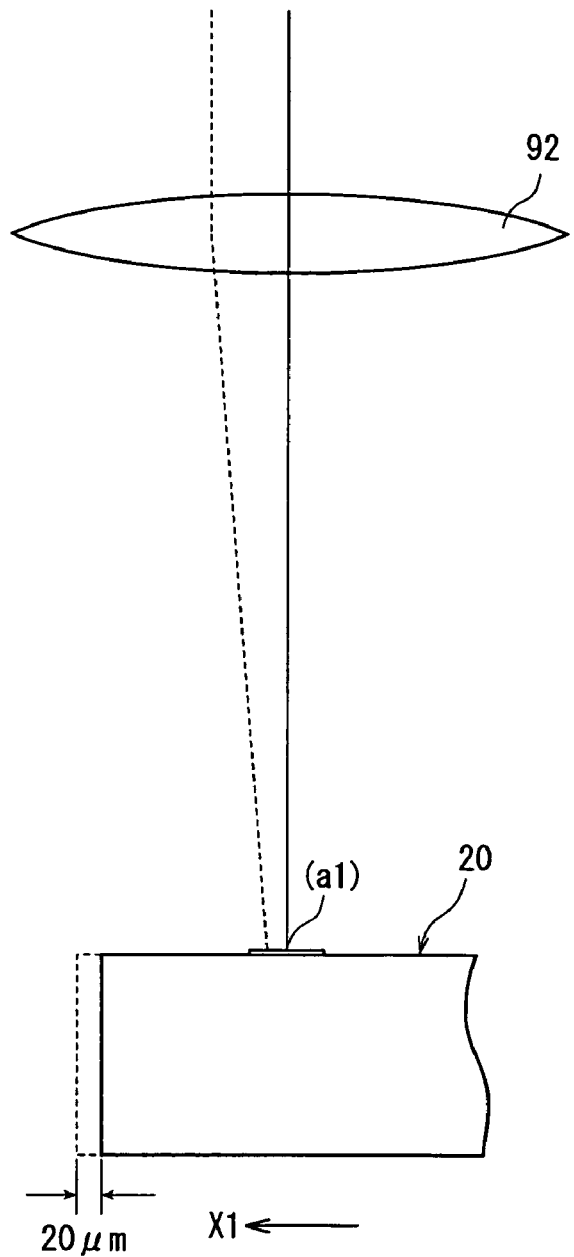
(b)
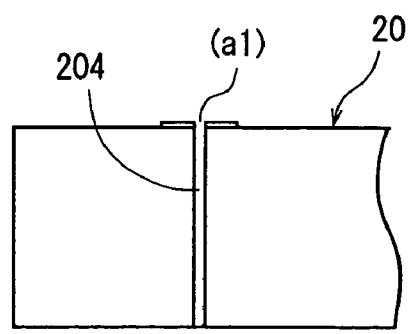

Fig. 9
(a)
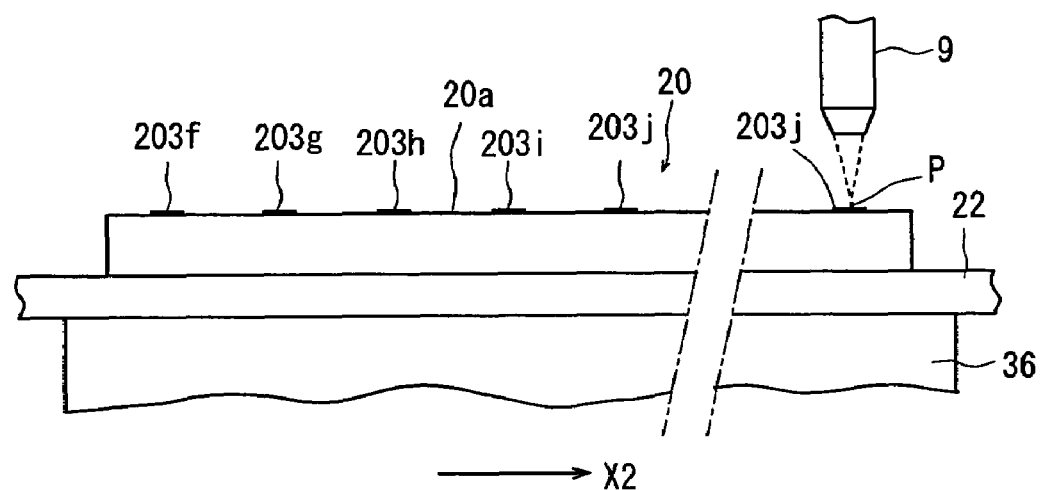
(b)
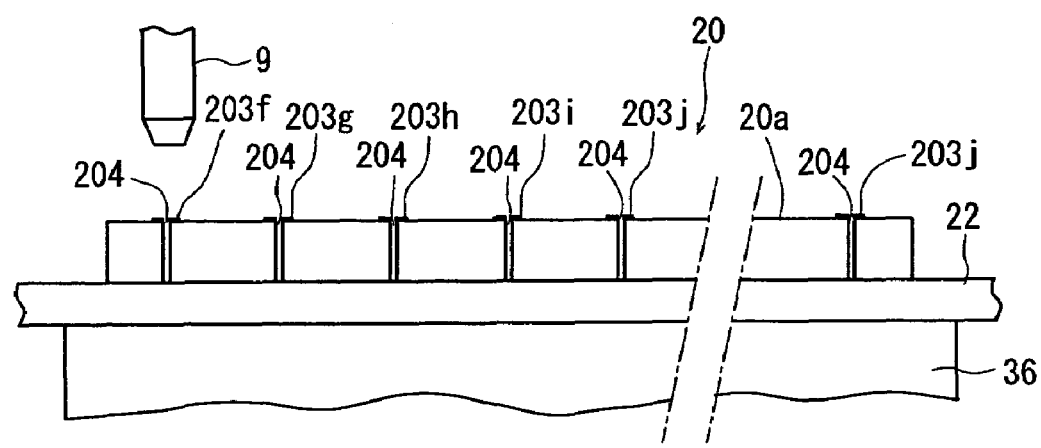

Fig. 10
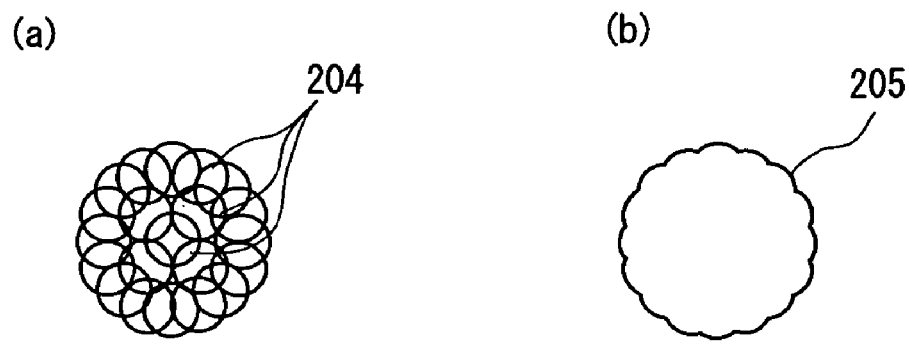
Fig. 11
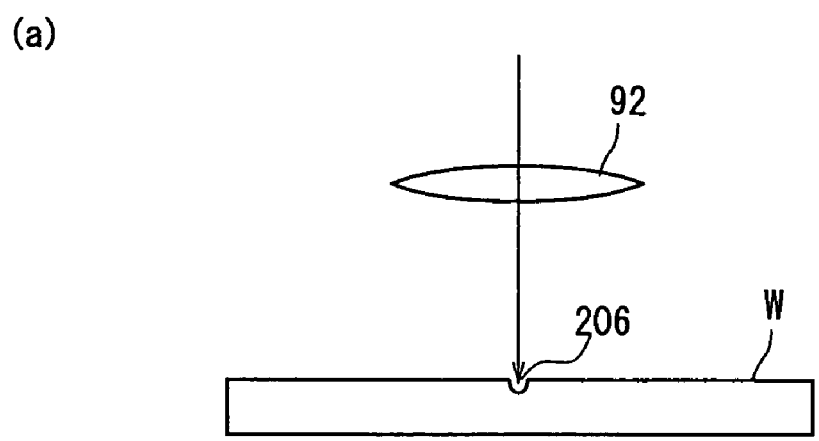
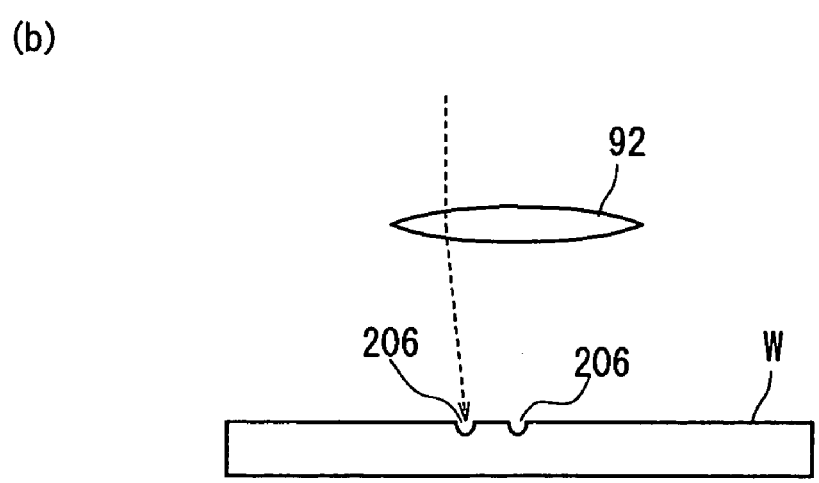

LASER BEAM PROCESSING MACHINE

FIELD OF THE INVENTION

The present invention relates to a laser beam processing machine for forming a plurality of via holes in a workpiece.

DESCRIPTION OF THE PRIOR ART

In the production process of a semiconductor device, a plurality of areas are sectioned by dividing lines called "streets" which are arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas in which the device is each formed.

As a means of reducing the size and increasing the number of functions of an apparatus, a modular structure for connecting the electrodes of a plurality of semiconductor chips which are stacked up in layers is disclosed by JP-A 2003-163323. This modular structure is a structure in which via holes are formed at the positions at which the electrode is formed, in a semiconductor wafer and a conductive material such as aluminum for connecting the electrodes is buried in the via holes.

The above via holes in the semiconductor wafer are generally formed by a drill. Therefore, the diameters of the via holes formed in the semiconductor wafer are 100 to 300 μm and hence, drilling of the via holes reduces productivity.

To solve the above problem, the present applicants propose a laser beam processing machine capable of forming via holes in a workpiece such as a semiconductor wafer efficiently as JP-A 2006-247674. This laser beam processing machine comprises a chuck table for holding a workpiece, a processing-feed amount detection means for detecting the processing-feed amount of the chuck table holding the workpiece relative to a laser beam application means, a memory means for storing the X and Y coordinate values of the via holes to be formed in the workpiece, and a control means for controlling the laser beam application means based on the X and Y coordinate values of the via holes stored in the memory means and a detection signal from the processing-feed amount detection means. When the point of the X and Y coordinate values of a via hole to be formed in the workpiece reaches a position right below a condenser of the laser beam application means, one pulse of a laser beam is so constituted to be applied.

To form a via hole in the workpiece, however, a pulse laser beam must be applied to the same position a plurality of times. When the above-mentioned laser beam processing machine is used, the workpiece must be moved a plurality of times, which is not always satisfactory in the terms of productivity.

Further, it is desired that a plurality of grooves can be formed in the workpiece by only moving it in the processing-feed direction without moving (indexing-feeding) it in the indexing-feed direction (Y-axis direction) perpendicular to the processing-feed direction (X-axis direction).

SUMMARY OF THE INVENTION

It is an object of the present invention to provide a laser beam processing machine capable of forming via holes in a workpiece such as a semiconductor wafer or the like efficiently and forming a plurality of grooves by only moving the workpiece in the processing-feed direction.

To attain the above object, according to the present invention, there is provided a laser beam processing machine comprising a chuck table for holding a workpiece, a laser beam application means (device) for applying a laser beam to the workpiece held on the chuck table, a processing-feed means (device) for moving the chuck table and the laser beam application means relative to each other in a processing-feed direction (X-axis direction), and an indexing-feed means (device) for moving the chuck table and the laser beam application means relative to each other in an indexing-feed direction (Y-axis direction) perpendicular to the processing-feed direction (X-axis direction), wherein the laser beam application means comprises a laser oscillation means (device) for oscillating a laser beam, a first acousto-optic deflection means (device) for deflecting the optical axis of a laser beam oscillated by the laser beam oscillation means in the processing-feed direction (X-axis direction), and a second acousto-optic deflection means (device) for deflecting the optical axis of a laser beam oscillated by the laser beam oscillation means in the indexing-feed direction (Y-axis direction).

The above first acousto-optic deflection means comprises a first acousto-optic device for deflecting the optical axis of a laser beam oscillated by the laser beam oscillation means in the processing-feed direction (X-axis direction), a first RF oscillator for applying RF to the first acousto-optic device and a first deflection angle adjusting means (device) for adjusting the frequency of RF output from the first RF oscillator; and the above second acousto-optic deflection means comprises a second acousto-optic device for deflecting the optical axis of a laser beam oscillated by the laser beam oscillation means in the indexing-feed direction (Y-axis direction), a second RF oscillator for applying RF to the second acousto-optic device, and a second deflection angle adjusting means (device) for adjusting the frequency of RF output from the second RF oscillator.

The above first acousto-optic deflection means comprises a first output adjusting means (device) for adjusting the amplitude of RF output from the first RF oscillator, and the above second acousto-optic deflection means comprises a second output adjusting means (device) for adjusting the amplitude of RF output from the second RF oscillator.

The laser beam processing machine further comprises a processing-feed amount detection means (device) for detecting the processing-feed amount of the chuck table relative to the laser beam application means, an indexing-feed amount detection means (device) for detecting the indexing-feed amount of the chuck table relative to the laser beam application means, a memory means (device) for storing the X and Y coordinate values of an area to be processed of the workpiece, and a control means (device) for controlling the first acousto-optic deflection means and the second acousto-optic deflection means based on the X and Y coordinate values stored in the memory means and detection signals from the processing-feed amount detection means and the indexing-feed amount detection means.

In the laser beam processing machine according to the present invention, since the control means controls the first acousto-optic deflection means based on a detection signal from the processing-feed amount detection means to deflect the optical axis of a laser beam oscillated by the laser beam oscillation means in the processing-feed direction (X-axis direction), a plurality of pulses of the pulse laser beam can be applied to a predetermined position even in a state where the workpiece held on the chuck table is moving in the processing-feed direction, thereby making it possible to form via holes efficiently.

In the laser beam processing machine according to the present invention, since the optical axis of a pulse laser beam is deflected in the indexing-feed direction (Y-axis direction) by activating the second acousto-optic deflection means of the laser beam application means to apply the pulse laser beam to the workpiece, a plurality of grooves can be formed in the workpiece or two-dimensional (2-D) processing can be made on the workpiece in the X-axis direction and the Y-axis direction by only moving the workpiece in the processing-feed direction without moving it in the indexing direction.

BRIEF DESCRIPTION OF THE DRAWINGS

FIGS. 7(a) and 7(b) are explanatory diagrams showing the drilling step using the laser beam processing machine shown in FIG. 1;

FIGS. 8(a) and 8(b) are enlarged explanatory diagrams showing the details of the drilling step shown in FIGS. 7(a) and 7(b);

FIGS. 9(a) and 9(b) are explanatory diagrams showing the drilling step which is carried out with the laser beam processing machine shown in FIG. 1;

FIGS. 10(a) and 10(b) are explanatory diagrams showing another example of the laser processing method which is carried out by using the laser beam processing machine shown in FIG. 1; and FIGS. 11(a) and 11(b) are explanatory diagrams showing still another example of the laser processing method which is carried out by using the laser beam processing machine shown in FIG. 1.

DETAILED DESCRIPTION OF THE PREFERRED EMBODIMENTS

A laser beam processing machine constituted according to the present invention will be described in more detail hereinunder with reference to the accompanying drawings.

Figure 1:
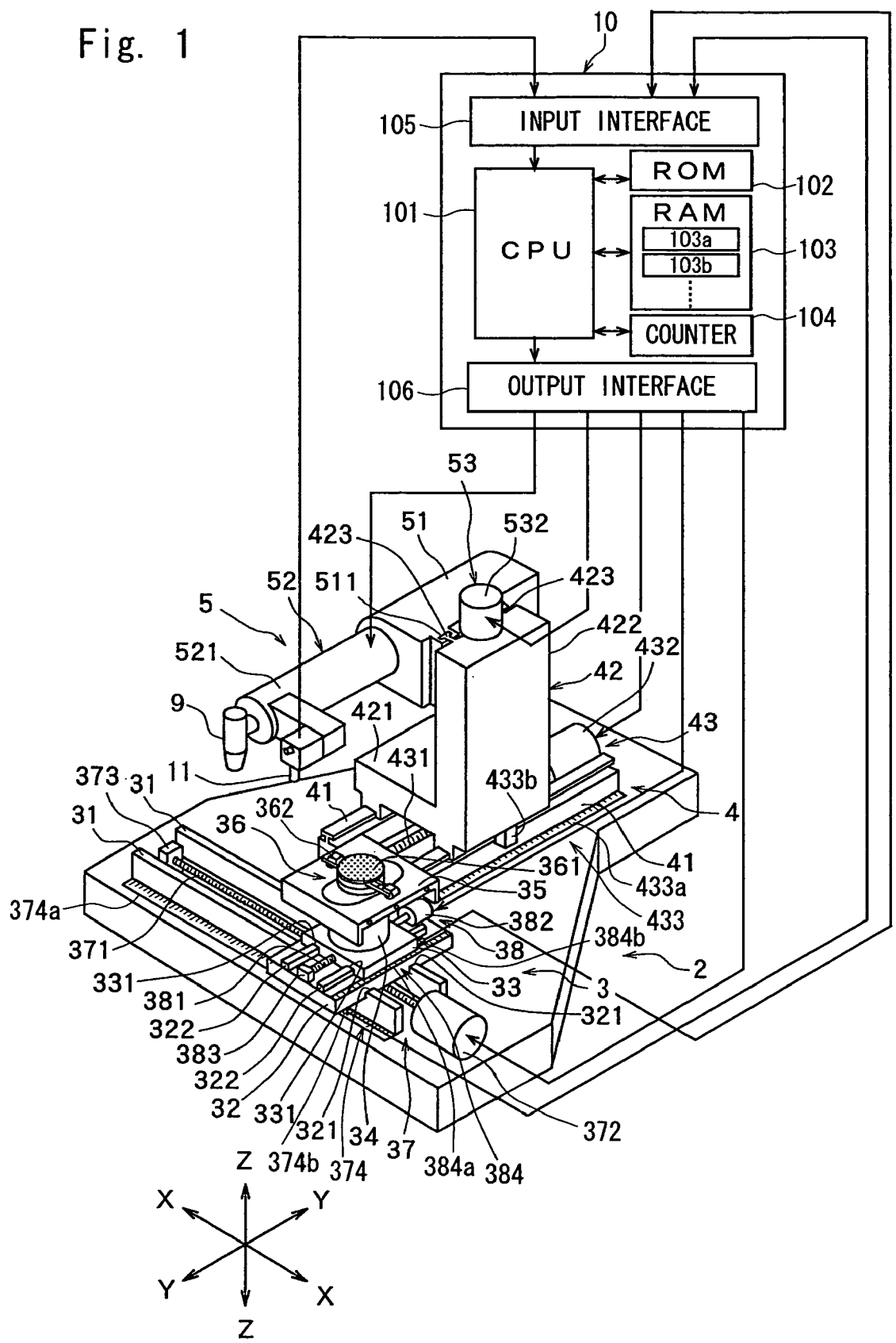
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X (X-axis direction), a laser beam application unit support mechanism 4 mounted on the stationary base 2 in such a manner that it can move in an indexing-feed direction indicated by an arrow Y (Y-axis direction) perpendicular to the direction indicated by the arrow X (X-axis direction), and a laser beam application unit 5 mounted on the laser beam application unit support mechanism 4 in such a manner that it can move in a direction indicated by an arrow Z (Z-axis direction).

The above chuck table mechanism 3 comprises a pair of guide rails 31 and 31 which are mounted on the stationary base 2 and arranged parallel to each other in the processing-feed direction indicated by the arrow X (X-axis direction), a first sliding block 32 mounted on the guide rails 31 and 31 in such a manner that it can move in the processing-feed direction indicated by the arrow X (X-axis direction), a second sliding block 33 mounted on the first sliding block 32 in such a manner that it can move in the indexing-feed direction indicated by the arrow Y (Y-axis direction), a cover table 35 supported on the second sliding block 33 by a cylindrical member 34, and a chuck table 36 as a workpiece holding means (device). This chuck table 36 comprises an adsorption chuck 361 made of a porous material, and a workpiece, for example, a disk-like semiconductor wafer is held on the adsorption chuck 361 by a suction means (device) that is not shown. The chuck table 36 constituted as described above is rotated by a pulse motor (not shown) installed in the cylindrical member 34. The chuck table 36 is provided with clamps 362 for fixing an annular frame which will be described later.

The above first sliding block 32 has, on its undersurface, a pair of to-be-guided grooves 321 and 321 to be fitted to the above pair of guide rails 31 and 31 and, on the top surface, a pair of guide rails 322 and 322 formed parallel to each other in the indexing-feed direction indicated by the arrow Y (Y-axis direction). The first sliding block 32 constituted as described above can move along the pair of guide rails 31 and 31 in the processing-feed direction indicated by the arrow X (X-axis direction) by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction indicated by the arrow X (X-axis direction). The processing-feed means 37 has a male screw rod 371 which is arranged between the above pair of guide rails 31 and 31 parallel to them and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X (X-axis direction).

The laser beam processing machine in the illustrated embodiment has a processing-feed amount detection means 374 for detecting the processing-feed amount of the above chuck table 36. The processing-feed amount detection means 374 is composed of a linear scale 374a arranged along the guide rail 31 and a read head 374b which is mounted on the first sliding block 32 and moves along the linear scale 374a together with the first sliding block 32. The read head 374b of this processing-feed amount detection means 374 supplies one pulse signal for every 1.0 μm to a control means which will be described later in the illustrated embodiment. The control means detects the processing-feed amount of the chuck table 36 by counting the input pulse signals. When the pulse motor 372 is used as a drive source for the above processing-feed means 37, the processing-feed amount of the chuck table 36 can be detected by counting the drive pulses of the control means (later described) for outputting a drive signal to the pulse motor 372. When a servo motor is used as the drive source for the above processing-feed means 37, a pulse signal outputted from a rotary encoder for detecting the revolution of the servo motor is supplied to the control means (later described) which in turn counts the input pulse signals to detect the processing-feed amount of the chuck table 36.

The above second sliding block 33 has, on its undersurface, a pair of to-be-guided grooves 331 and 331 to be fitted to the pair of guide rails 322 and 322 on the top surface of the above first sliding block 32 and can move in the indexing-feed direction indicated by the arrow Y (Y-axis direction) when the to-be-guided grooves 331 and 331 are fitted to the pair of guide rails 322 and 322, respectively. The chuck table mechanism 3 in the illustrated embodiment has a first indexing-feed means 38 for moving the second sliding block 33 in the indexing-feed direction indicated by the arrow Y (Y-axis direction) along the pair of guide rails 322 and 322 provided on the first sliding block 32. The first indexing-feed means 38 comprises a male screw rod 381 which is arranged between the above pair of guide rails 322 and 322 parallel to them and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y (Y-axis direction).

The laser beam processing machine in the illustrated embodiment has a first indexing-feed amount detection means 384 for detecting the indexing-feed amount of the above second sliding block 33. This first indexing-feed amount detection means 384 is composed of a linear scale 384a arranged along the guide rail 322 and a read head 384b which is mounted on the second sliding block 33 and moves along the linear scale 384a together with the second sliding block 33. The read head 384b of the indexing-feed amount detection means 384 supplies one pulse signal for every 1 μm to the control means (later described) in the illustrated embodiment. The control means (later described) detects the indexing-feed amount of the chuck table 36 by counting the input pulse signals. When the pulse motor 382 is used as a drive source for the above first indexing-feed means 38, the indexing-feed amount of the chuck table 36 can be detected by counting the drive pulses of the control means (later described) for outputting a drive signal to the pulse motor 382. When a servo motor is used as the drive source for the above first indexing-feed means 38, a pulse signal outputted from the rotary encoder for detecting the revolution of the servo motor is supplied to the control means (later described) which in turn counts the input pulse signals to detect the indexing-feed amount of the chuck table 36.

The above laser beam application unit support mechanism 4 comprises a pair of guide rails 41 and 41 mounted on the stationary base 2 and arranged parallel to each other in the indexing-feed direction indicated by the arrow Y (Y-axis direction) and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z (Z-axis direction) on one of its flanks. The laser beam application unit support mechanism 4 in the illustrated embodiment has a second indexing-feed means 43 for moving the movable support base 42 along the pair of guide rails 41 and 41 in the indexing-feed direction indicated by the arrow Y (Y-axis direction). This second indexing-feed means 43 comprises a male screw rod 431 arranged between the above pair of guide rails 41 and 41 parallel to each other and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y (Y-axis direction).

The laser beam processing machine in the illustrated embodiment comprises a second indexing-feed amount detection means 433 for detecting the indexing-feed amount of the movable support base 42 of the above laser beam application unit support mechanism 4. This second indexing-feed amount detection means 433 comprises a linear scale 433a arranged along the guide rail 41 and a read head 433b which is mounted on the movable support base 42 and moves along the linear scale 433a. The read head 433b of this second indexing-feed amount detection means 433 supplies one pulse signal for every 1 μm to the control means (later-described) in the illustrated embodiment. The control means detects the indexing-feed amount of the laser beam application unit 5 by counting the input pulse signals. When the pulse motor 432 is used as a drive source for the above second indexing-feed means 43, the indexing-feed amount of the laser beam application unit 5 can be detected by counting the drive pulses of the control means (later described) for outputting a drive signal to the pulse motor 432. When a servo motor is used as the drive source for the above second indexing-feed means 43, a pulse signal outputted from the rotary encoder for detecting the revolution of the servo motor is supplied to the control means (later described), which in turn counts the input pulse signals to detect the indexing feed-amount of the laser beam application unit 5.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 provided on the above mounting portion 422 and is supported in such a manner that it can move in the direction indicated by the arrow Z (Z-axis direction) by fitting the to-be-guided grooves 511 and 511 to the above guide rails 423 and 423, respectively.

The laser beam application unit 5 in the illustrated embodiment has a moving means (device) 53 for moving the unit holder 51 along the pair of guide rails 423 and 423 in the direction indicated by the arrow Z (Z-axis direction). The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z (Z-axis direction). In the illustrated embodiment, the laser beam application means 52 is moved up by driving the pulse motor 532 in the normal direction and moved down by driving the pulse motor 532 in the reverse direction.

Figure 2:
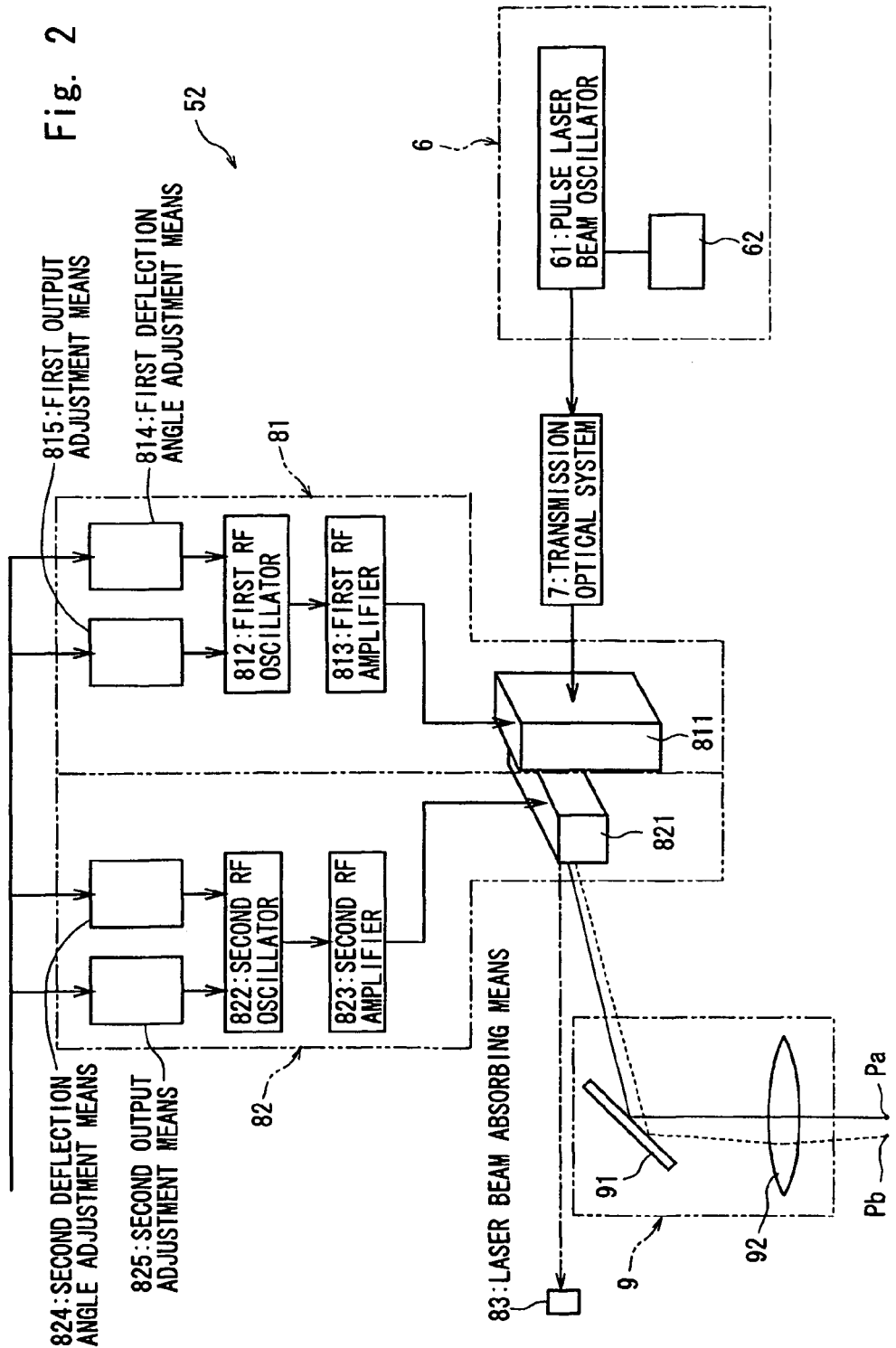
FIG. 2 is a block diagram of a laser beam application means provided in the laser beam processing machine shown in FIG. 1.

The above laser beam application means 52 comprises a cylindrical casing 521 arranged substantially horizontally, a pulse laser beam oscillation means 6, a transmission optical system 7, a first acousto-optic deflection means 81 for deflecting the optical axis of a laser beam oscillated by the pulse laser beam oscillation means 6 in the processing-feed direction (X-axis direction) and a second acousto-optic deflection means 82 for deflecting the optical axis of a laser beam oscillated by the pulse laser beam oscillation means 6 in the indexing-feed direction (Y-axis direction) installed in the casing 521, as shown in FIG. 2. The laser beam application means 52 has a processing head 9 for applying a pulse laser beam passing through the first acousto-optic deflection means 81 and the second acousto-optic deflection means 82 to the workpiece held on the above chuck table 36.

The above pulse laser beam oscillation means 6 is constituted by a pulse laser beam oscillator 61 composed of a YAG laser oscillator or YVO4 laser oscillator and a repetition frequency setting means 62 connected to the pulse laser beam oscillator 61. The above transmission optical system 7 comprises suitable optical elements.

The above first acousto-optic deflection means 81 comprises a first acousto-optic device 811 for deflecting the optical axis of a laser beam oscillated by the laser beam oscillation means 6 in the processing-feed direction (X-axis direction), a first RF oscillator 812 for generating RF (radio frequency) to be applied to the first acousto-optic device 811, a first RF amplifier 813 for amplifying the power of RF generated by the first RF oscillator 812 to apply it to the first acousto-optic device 811, a first deflection angle adjusting means 814 for adjusting the frequency of RF generated by the first RF oscillator 812, and a first output adjusting means 815 for adjusting the amplitude of RF generated by the first RF oscillator 812. The above first acousto-optic device 811 can adjust the deflection angle of the optical axis of a laser beam according to the frequency of the applied RF and the output of a laser beam according to the amplitude of the applied RF. The first deflection angle adjusting means 814 and the first output adjusting means 815 are controlled by the control means which will be described later.

The above second acousto-optic deflection means 82 comprises a second acousto-optic device 821 for deflecting the optical axis of a laser beam oscillated by the laser beam oscillation means 6 in the indexing-feed direction (Y-axis direction: direction perpendicular to the sheet in FIG. 2) perpendicular to the processing-feed direction (X-axis direction), a second RF oscillator 822 for generating RF to be applied to the second acousto-optic device 821, a second RF amplifier 823 for amplifying the power of RF generated by the second RF oscillator 822 to apply it to the second acousto-optic device 821, a second deflection angle adjusting means 824 for adjusting the frequency of RF generated by the second RF oscillator 822 and a second output adjusting means 825 for adjusting the amplitude of RF generated by the second RF oscillator 822. The above second acousto-optic device 821 can adjust the deflection angle of the optical axis of a laser beam according to the frequency of the applied RF and the output of a laser beam according to the amplitude of the applied RF. The above second deflection angle adjusting means 824 and the second output adjusting means 825 are controlled by the control means which will be described later.

The laser beam application means 52 in the illustrated embodiment comprises a laser beam absorbing means (device) 83 for absorbing a laser beam not deflected by the first acousto-optic device 811 as shown by a one-dot chain line in FIG. 2 when RF is not applied to the above first acousto-optic device 811.

The above processing head 9 is attached to the end of the casing 521 and has a direction changing mirror 91 for changing the direction of a pulse laser beam passing through the above first acousto-optic deflection means 81 and the second acousto-optic deflection means 82 to a downward direction, and a condenser lens 92 for converging a laser beam whose direction has been changed by the direction changing mirror 91.

The laser beam application means 52 in the illustrated embodiment is constituted as described above. When RF is not applied to the first acousto-optic device 811 and the second acousto-optic device 821, a pulse laser beam oscillated by the pulse laser beam oscillation means 6 is guided to the laser beam absorbing means 83 as shown by the one-dot chain line in FIG. 2 through the transmission optical system 7, the first acousto-optic device 811 and the second acousto-optic device 821. Meanwhile, when RF having a frequency of, for example, 10 kHz is applied to the first acousto-optic device 811, the optical axis of a pulse laser beam oscillated by the pulse laser beam oscillation means 6 is deflected and converged at a focal point Pa as shown by the solid line in FIG. 2. When RF having a frequency of, for example, 20 kHz is applied to the first acousto-optic device 811, the optical axis of a pulse laser beam oscillated by the pulse laser beam oscillation means 6 is deflected as shown by the broken line in FIG. 2 and converged at a focal point Pb which shifts from the above focal point Pa by a predetermined distance in the processing-feed direction (X-axis direction). When RF having a predetermined frequency is applied to the second acousto-optic device 821, the optical axis of a pulse laser beam oscillated by the pulse laser beam oscillation means 6 is converged at a position which shifts from the above focal point Pa by a predetermined distance in the indexing-feed direction (Y-axis direction, direction perpendicular to the sheet in FIG. 2) perpendicular to the processing-feed direction (X-axis direction).

The laser beam processing machine in the illustrated embodiment comprises an image pick-up means (device) 11 which is mounted on the front end of the casing 521 and detects the area to be processed by the above laser beam application means 52. This image pick-up means 11 comprises an illuminating means (device) for illuminating the workpiece, an optical system for capturing the area illuminated by the illuminating means, and an image pick-up device (CCD) for picking up an image captured by the optical system. A signal of the picked-up image is supplied to the control means which will be described later.

Returning to FIG. 1, the laser beam processing machine in the illustrated embodiment comprises the control means 10. The control means 10 is composed of a computer which comprises a central processing unit (CPU) 101 for carrying out arithmetic processing based on a control program, a read-only memory (ROM) 102 for storing the control program, etc., a read/write random access memory (RAM) 103 for storing data on the design values of the workpiece and the results of operations both of which will be described later, a counter 104, an input interface 105 and an output interface 106. Detection signals from the above processing-feed amount detection means 374, the first indexing-feed amount detection means 384, the second indexing-feed amount detection means 433, the image pick-up means 11, etc. are input to the input interface 105 of the control means 10. Control signals are output from the output interface 106 of the control means 10 to the pulse motor 372, the pulse motor 382, the pulse motor 432, the pulse motor 532, the laser beam application means 52, etc. The above random access memory (RAM) 103 has a first storage area 103a for storing data on the design values (later described) of the workpiece, a second storage area 103b for storing data on the detection values (later described), and other storage area.

The laser beam processing machine in the illustrated embodiment is constituted as described above, and its operation will be described hereinbelow.

Figure 3:
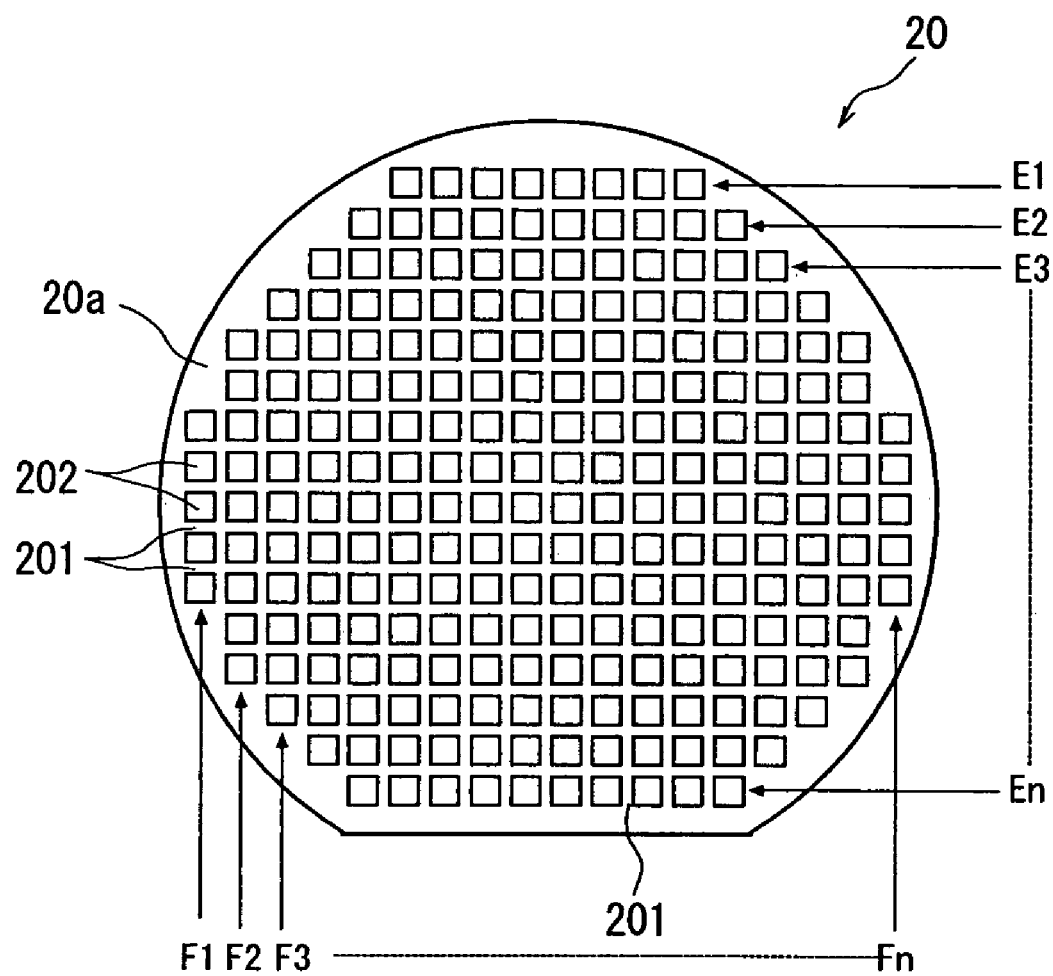
FIG. 3 is a plan view of a semiconductor wafer as a workpiece.
Figure 4:
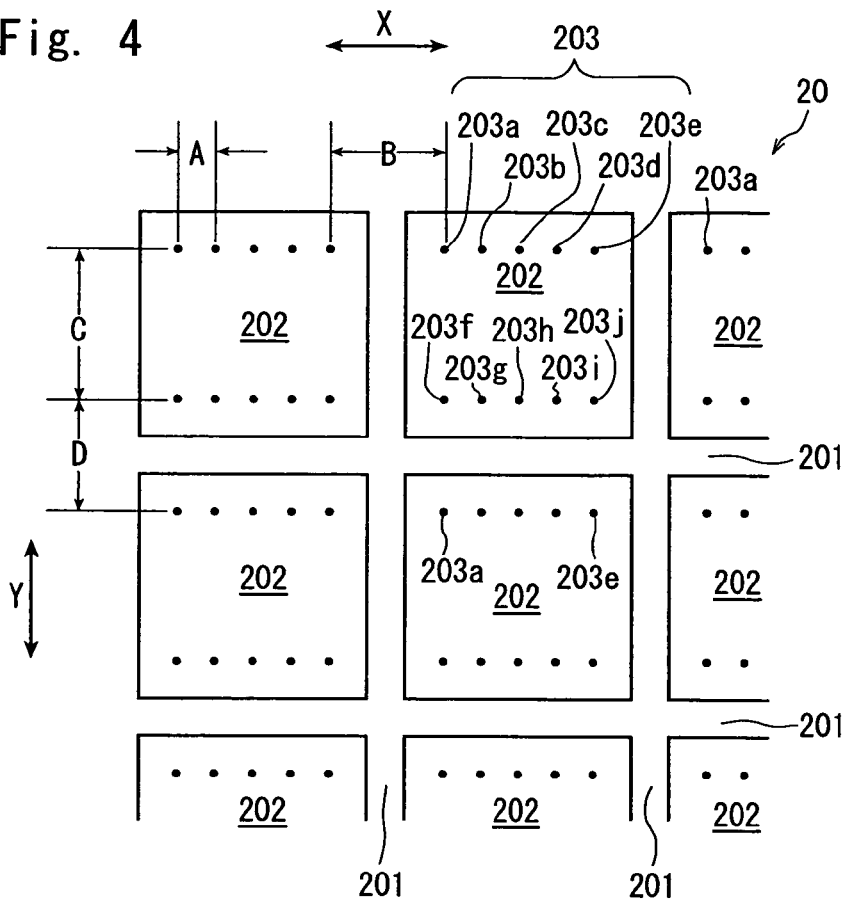
FIG. 4 is a partially enlarged plan view of the semiconductor wafer shown in FIG. 3.

FIG. 3 is a plan view of a semiconductor wafer 20 as the workpiece to be processed by a laser beam. The semiconductor wafer 20 shown in FIG. 3 is a silicon wafer, a plurality of areas are sectioned by a plurality of dividing lines 201 arranged in a lattice pattern on the front surface 20a, and a device 202 such as IC or LSI is formed in each of the sectioned areas. The devices 202 are the same in constitution. A plurality of electrodes 203 (203a to 203j) are formed on the surface of each device 202 as shown in FIG. 4. In the illustrated embodiment, electrodes 203a and 203f, electrodes 203b and 203g, electrodes 203c and 203h, electrodes 203d and 203i, and electrodes 203e and 203j are at the same positions in the X-axis direction. A via hole is formed respectively in the plurality of electrodes 203 (203a to 203j). The intervals A between adjacent electrodes 203 (203a to 203j) in the X-axis direction (horizontal direction in FIG. 4) and the intervals B between adjacent electrodes in the X-axis direction (horizontal direction in FIG. 4) with the dividing line 201 interposed therebetween, that is, between the electrodes 203e and 203a out of the electrodes 203 formed on each device 202 are the same in the illustrated embodiment. The intervals C between adjacent electrodes 203 (203a to 203j) in the Y-axis direction (vertical direction in FIG. 4) and the intervals D between adjacent electrodes in the Y-axis direction (vertical direction in FIG. 4) with the dividing line 201 interposed therebetween, that is, between the electrodes 203f and 203a and between the electrodes 203j and 203e out of the electrodes 203 formed on each device 202 are the same in the illustrated embodiment. The design value data of the semiconductor wafer 20 constituted as described above, which include the numbers of devices 202 disposed in rows E1 to En and columns F1 to Fn shown in FIG. 3 and the above intervals A, B, C and D, are stored in the first storage area 103a of the above random access memory (RAM) 103.

An embodiment of laser processing for forming a via hole in the electrodes 203 (203a to 203j) of each device 202 formed on the above semiconductor wafer 20 by using the above laser beam processing machine will be described hereinunder.

Figure 5:
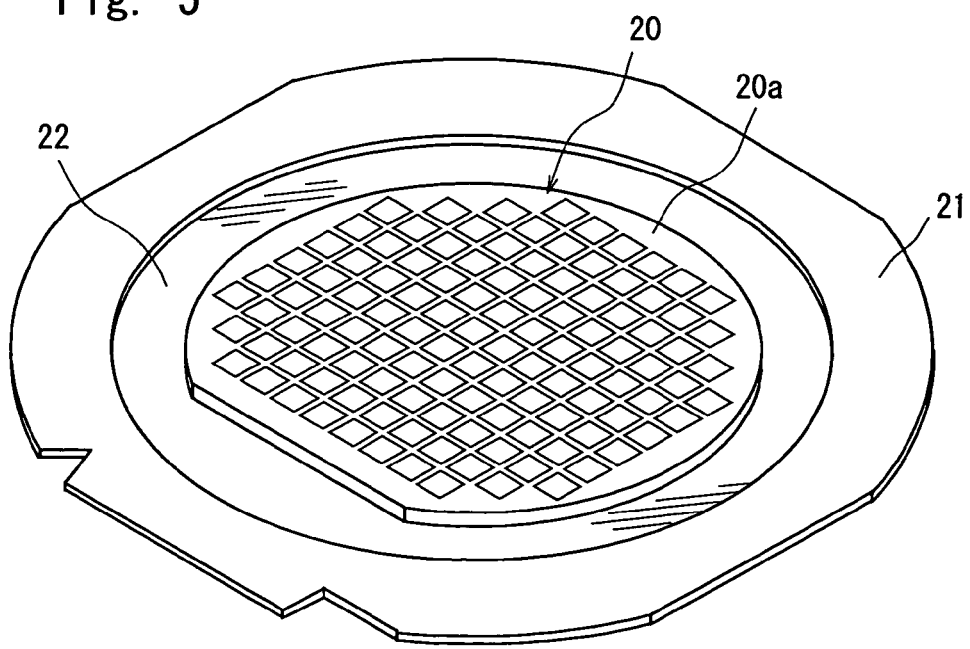
FIG. 5 is a perspective view showing a state where the semiconductor wafer shown in FIG. 3 is affixed to a protective tape mounted on an annular frame.

The semiconductor wafer 20 constituted as described above is put on a protective tape 22 which is composed of a synthetic resin sheet such as a polyolefin sheet and mounted on an annular frame 21 in such a manner that the front surface 20a faces up as shown in FIG. 5.

The semiconductor wafer 20 supported to the annular frame 21 through the protective tape 22 is placed on the chuck table 36 of the laser beam processing machine shown in FIG. 1 in such a manner that the protective tape 22 side comes into contact with the chuck table 36. The semiconductor wafer 20 is suction-held on the chuck table 36 through the protective tape 22 by activating the suction means that is not shown. The annular frame 21 is fixed by the clamps 362.

The chuck table 36 suction-holding the semiconductor wafer 20 as described above is brought to a position right below the image pick-up means 11 by the processing-feed means 37. When the chuck table 36 is positioned right below the image pick-up means 11, the semiconductor wafer 20 on the chuck table 36 is in a state of being located at a coordinate position shown in FIG. 6. In this state, alignment work is carried out to check whether the dividing lines 201 formed in a lattice pattern on the semiconductor wafer 20 held on the chuck table 36 are parallel to the X-axis direction and the Y-axis direction or not. That is, an image of the semiconductor wafer 20 held on the chuck table 36 is picked up by the image pick-up means 11 to carry out image processing such as pattern matching, etc. for the alignment work.

Thereafter, the chuck table 36 is moved to bring a device 202 at the most left end in FIG. 6 in the topmost row E1 out of the devices 202 formed on the semiconductor wafer 20 to a position right below the image pick-up means 11. Further, the upper left electrode 203a in FIG. 4 out of the electrodes 203 (203a to 203j) formed on the device 202 is brought to a position right below the image pick-up means 11. After the image pick-up means 11 detects the electrode 203a in this state, its coordinate values (a1) are supplied, as a first processing-feed start position coordinate value to the control means 10. And, the control means 10 stores the coordinate values (a1) in the second storage area 103b of the random access memory (RAM) 103 as the first processing-feed start position coordinate values (a processing-feed start position detecting step). Since there is a predetermined space between the image pick-up means 11 and the processing head 9 of the laser beam application means 52 in the X-axis direction at this point, a value obtained by adding the interval between the above image pick-up means 11 and the processing head 9 is stored as an X coordinate value.

Figure 6:
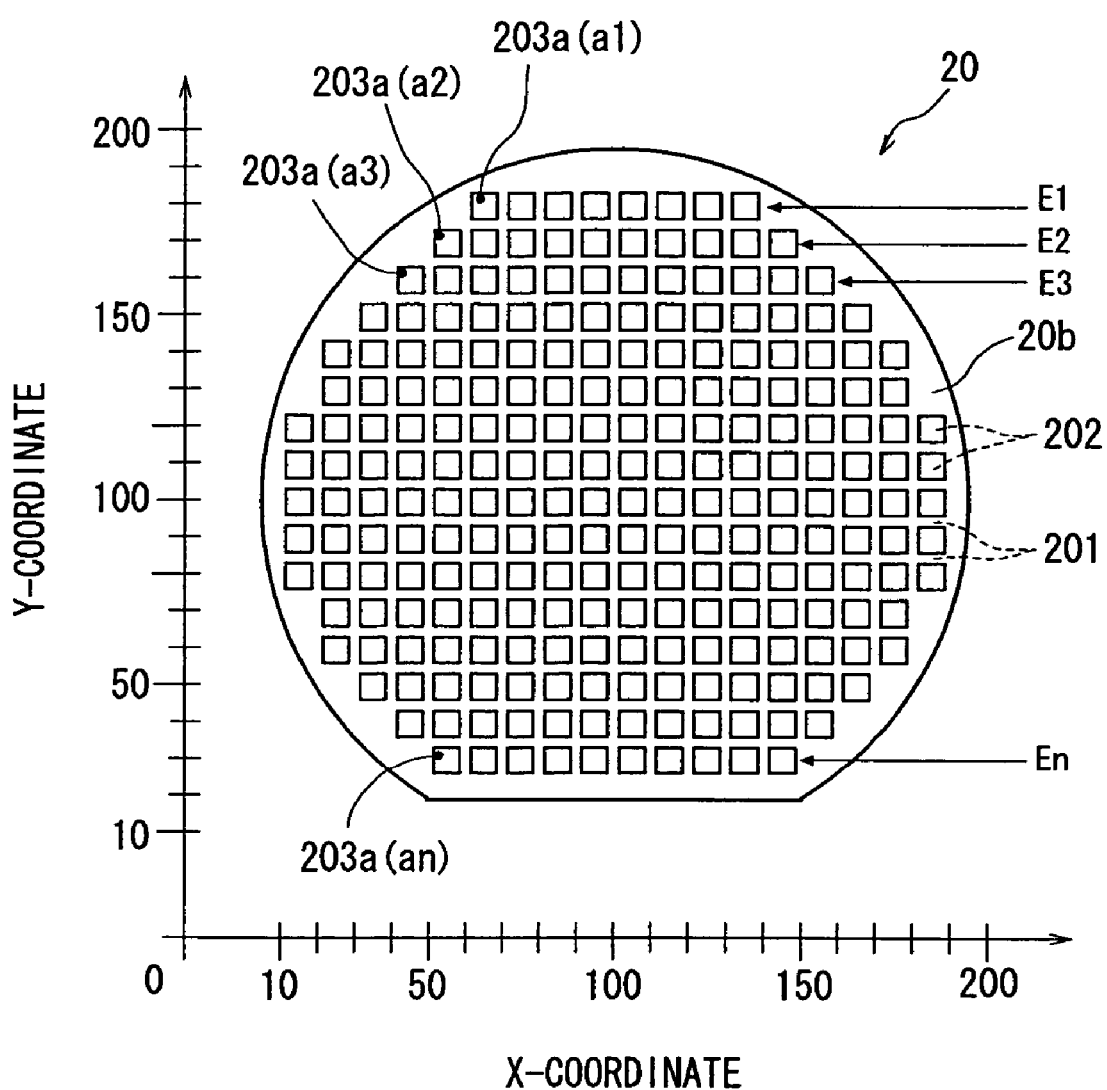
FIG. 6 is an explanatory diagram showing the coordinates in a state where the semiconductor wafer shown in FIG. 3 is held at a predetermined position of the chuck table of the laser beam processing machine shown in FIG. 1.

After the first processing-feed start position coordinate values (a1) of the device 202 in the topmost row E1 in FIG. 6 are detected as described above, the chuck table 36 is moved (indexing-fed) a distance corresponding to the interval between the dividing lines 201 in the Y-axis direction and brought in the X-axis direction to bring a device 202 at the most left end in the second row E2 from the topmost in FIG. 6 to a position right below the image pick-up means 11. Further, the upper left electrode 203a in FIG. 6 out of the electrodes 203 (203a to 203j) formed on the device 202 is brought to a position right below the image pick-up means 11. After the image pick-up means 11 detects the electrode 203a in this state, its coordinate values (a2) are supplied as second processing-feed start position coordinate values to the control means 10. And, the control means 10 stores the coordinate values (a2) in the second storage area 103b of the random access memory (RAM) 103 as the second processing-feed start position coordinate values. Since there is a predetermined space between the image pick-up means 11 and the processing head 9 of the laser beam application means 52 in the X-axis direction at this point as described above, a value obtained by adding the interval between the image pick-up means 11 and the processing head 9 is stored as an X coordinate value. The above indexing-feed and processing-feed start position detecting steps are repeated up to the bottom row En in FIG. 6 to detect the processing-feed start position coordinate values (a3 to an) of the devices 202 formed in the rows and store them in the second storage area 103b of the random access memory (RAM) 103.

Next comes the step of drilling a via hole in the electrodes 203 (203a to 203j) formed on each device 202 of the semiconductor wafer 20. In the drilling step, the processing-feed means 37 is first activated to move the chuck table 36 so as to bring the first processing-feed start position coordinate values (a1) stored in the second storage area 103b of the above random access memory (RAM) 103 to a position right below the processing head 9 of the laser beam application means 52. FIG. 7(a) shows a state of the first processing-feed start position coordinate values (a1) being positioned right below the processing head 9. The control means 10 controls the above processing-feed means 37 to move (processing-feed) the chuck table 36 in the state shown in FIG. 7(a) in the direction indicated by the arrow X1 at a predetermined moving rate, and activates the laser beam application means 52 to apply a pulse laser beam from the processing head 9 for a predetermined time at the same time. The focal point P of a laser beam applied from the processing head 9 is set to a position near the front surface 20a of the semiconductor wafer 20. At this point, the control means 10 outputs a control signal to the first deflection angle adjusting means 814 and the first output adjusting means 815 of the first acousto-optic deflection means 81 based on a detection signal sent from the read head 374b of the processing-feed amount detection means 374 for a predetermined time during which a pulse laser beam is applied. That is, the control means 10 controls the frequency of RF generated by the first RF oscillator 812 to a range of, for example, 10 to 20 kHz and outputs a control signal to ensure that the amplitude of RF generated by the first RF oscillator 812 becomes a predetermined value. The first RF oscillator 812 outputs RF based on control signals from the first deflection angle adjusting means 814 and the first output adjusting means 815. The power of RF output from the first RF oscillator 812 is amplified by the first RF amplifier 813 and applied to the first acousto-optic device 811. As a result, the first acousto-optic device 811 deflects the optical axis of a pulse laser beam oscillated by the pulse laser beam oscillation means 6 to a range from the position shown by the solid line in FIG. 2 up to the position shown by the broken line in FIG. 2.

The processing conditions in the above drilling step are set as follows, for example.

Light source: LD excited Q switch Nd: YVO4
Wavelength: 355 nm
Repetition frequency: 50 kHz
Output: 3 W
Focusing spot diameter: 15 μm
Processing-feed rate: 100 mm/sec When the drilling step is carried out under the above processing conditions, a hole having a depth of about 5 μm per one pulse of the pulse laser beam can be formed in the silicon wafer. Therefore, to form a via hole in a silicon wafer having a thickness of 50 μm, 10 pulses of the pulse laser beam must be applied. Consequently, 10 pulses of the pulse laser beam must be applied to the first processing-feed start position coordinate values (a1) of the semiconductor wafer 20 held on the chuck table 36 which is moved at a feed rate of 100 mm/sec under the above processing conditions.

The method of applying 10 pulses of the pulse laser beam to the first processing-feed start position coordinate values (a1) of the semiconductor wafer 20 when the semiconductor wafer 20 is moved at a processing-feed rate of 100 mm/sec will be described with reference to FIGS. 8(a) and 8(b).

Since the repetition frequency of the pulse laser beam under the above processing conditions is 50 kHz, 50,000 pulses (50,000 pulses/sec) of the pulse laser beam are applied for one second. Therefore, the time for applying 10 pulses of the pulse laser beam is 1/5,000 sec. Meanwhile, the semiconductor wafer 20 which moves in the direction indicated by X1 at a processing-feed rate of 100 mm/sec moves 20 μm for 1/5,000 sec. Therefore, the laser beam application means 52 is activated for 1/5,000 sec during which the semiconductor wafer 20 moves 20 μm, and the first deflection angle adjusting means 814 controls the frequency of RF output from the first RF oscillator 812 in 10 stages for 1/5,000 sec to ensure that the focal point of the pulse laser beam is brought to a position at the first processing-feed start position coordinate values (a1) during this time. That is, in a state where the first processing-feed start position coordinate values (a1) of the semiconductor wafer 20 is positioned right below the condenser lens 92 as shown in FIG. 8(a), RF having a frequency of, for example, 10 kHz is applied to the first acousto-optic device 811 to apply the optical axis of the pulse laser beam as shown by the solid line and at the same time, the optical axis of the laser beam is deflected in the direction shown by X1 in 10 stages from the position shown by the solid line up to the position shown by the broken line while the semiconductor wafer 20 moves 20 μm. The deflection of the optical axis of the laser beam can be carried out by controlling the frequency of RF applied to the first acousto-optic device 811 of the first acousto-optic deflection means 81 based on a detection signal from the read head 374b of the processing-feed amount detection means 374, as described above. As a result, since 10 pulses of the pulse laser beam can be applied to the first processing-feed start position coordinate values (a1) even in a state of the semiconductor wafer 20 moving in the processing-feed direction X1, a via hole 204 is formed at the first processing-feed start position coordinate values (a1) of the semiconductor wafer 20 as shown in FIG. 8(b). In the above drilling step, the amplitude of RF output by the first RF oscillator 812 may be controlled by the first output adjusting means 815 to adjust the output of the pulse laser beam.

Meanwhile, the control means 10 receives a detection signal from the read head 374b of the processing-feed amount detection means 374 and counts the detection signals by means of the counter 104. And, when the count value of the counter 104 reaches a value corresponding to the interval A between the electrodes 203 in the X-axis direction in FIG. 4, the control means 10 activates the laser beam application means 52 to carry out the above drilling step. Subsequently, the control means 10 activates the laser beam application means 52 to carry out the above drilling step each time the count value of the counter 104 reaches a value corresponding to the interval A or B between the electrodes 203 in the X-axis direction in FIG. 4. After the above drilling step is carried out on the electrode 203e at the most right end in FIG. 4 out of the electrodes 203 formed on the device 202 at the most right end in the row E1 of the semiconductor wafer 20, as shown in FIG. 7(b), the operation of the above processing-feed means 37 is suspended to stop the movement of the chuck table 36. As a result, a hole 204 is formed in each of the electrodes 203 (not shown) of the semiconductor wafer 20, as shown in FIG. 7(b).

Thereafter, the control means 10 controls the above first indexing-feed means 38 or the above second indexing-feed means 43 to move (indexing-feed) the processing head 9 of the laser beam application means 52 in the indexing-feed direction perpendicular to the sheet in FIG. 7(b). Meanwhile, the control means 10 receives, from a read head 433b of the second indexing-feed amount detection means 433, a detection signal and counts the detection signals by means of the counter 104. When the count value of the counter 104 reaches a value corresponding to the interval C between the electrodes 203 in the Y-axis direction in FIG. 4, the operation of the second indexing-feed means 43 is suspended to stop the movement of the processing head 9 of the laser beam application means 52. As a result, the processing head 9 is positioned right above the electrode 203j (see FIG. 4) opposed to the above electrode 203e. This state is shown in FIG. 9(a). In the state shown in FIG. 9(a), the control means 10 controls the above processing-feed means 37 so as to move (processing-feed) the chuck table 36 in the direction indicated by the arrow X2 in FIG. 9(a) at a predetermined moving rate and activates the laser beam application means 52 to carry out the above drilling step at the same time. Then, the control means 10 counts a detection signal from the read head 374b of the processing-feed amount detection means 374 by means of the counter 104 as described above and activates the laser beam application means 52 to carry out the above drilling step each time the count value reaches the interval A or B between the electrodes 203 in the X-axis direction in FIG. 4. After the above drilling step is carried out on the electrode 203f formed on the device 202 at the most left end in the row E1 of the semiconductor wafer 20 as shown in FIG. 9(b), the operation of the above processing-feed means 37 is suspended to stop the movement of the chuck table 36. As a result, a hole 204 is formed in each of the electrodes 203 (not shown) of the semiconductor wafer 20, as shown in FIG. 9(b).

After the holes 204 are formed in the electrodes 203 on the devices 202 in the row E1 of the semiconductor wafer 20 as described above, the control means 10 activates the processing-feed means 37 and the second indexing-feed means 43 to bring the second processing-feed start position coordinate values (a2) stored in the second storage area 103b of the above random access memory (RAM) 103 out of the electrodes 203 formed on the devices 202 in the row E2 of the semiconductor wafer 20 to a position right below the processing head 9 of the laser beam application means 52. Then, the control means 10 controls the laser beam application means 52, the processing-feed means 37 and the second indexing-feed means 43 to carry out the above drilling step on the electrodes 203 formed on the devices 202 in the row E2 of the semiconductor wafer 20. Thereafter, the above drilling step is also carried out on the electrodes 203 formed on the devices 202 in the rows E3 to En of the semiconductor wafer 20. As a result, a hole 204 is formed in each of all the electrodes 203 formed on the devices 202 of the semiconductor wafer 20.

In the above drilling step, the pulse laser beam is not applied to the semiconductor wafer 20 in the areas of the intervals A and the areas of the intervals B in the X-axis direction in FIG. 4. Thus, since the pulse laser beam is not applied to the semiconductor wafer 20, the above control means 10 stops RF to be applied to the first acousto-optic device 811 of the first acousto-optic deflection means 81. As a result, a pulse laser beam oscillated by the pulse laser beam oscillation means 6 is applied and absorbed by the laser beam absorbing means 83 as shown by the one-dot chain line in FIG. 2 and hence, is not guided to the above processing head 9, whereby the pulse laser beam is not applied to the semiconductor wafer 20.

As described above, in the laser beam processing machine in the illustrated embodiment, by adjusting the frequency of a high-frequency current to be applied to the first acousto-optic device 811 of the first acousto-optic deflection means 81 based on a detection signal from the read head 374b of the processing-feed amount detection means 374, a plurality of pulses of the pulse laser beam can be applied to a predetermined processing position even in a state of the semiconductor wafer 20 being moved in the processing-feed direction. Therefore, the holes 204 can be formed efficiently.

Further, in the above drilling step, the amplitude of RF oscillated from the first RF oscillator 812 is adjusted by controlling the first output adjusting means 815 of the first acousto-optic deflection means 81 to adjust the amplitude of RF to be applied to the first acousto-optic device 811, thereby making it possible to suitably adjust the output of the pulse laser beam.

Another embodiment of laser processing by activating the first acousto-optic deflection means 81 and the second acousto-optic deflection means 82 of the above-described laser beam application means 52 will be described with reference to FIGS. 10(a) and 10(b)

That is, when the optical axis of a pulse laser beam is deflected in the X-axis direction and the Y-axis direction sequentially by activating the first acousto-optic deflection means 81 and the second acousto-optic deflection means 82 in a state where the workpiece held on the above chuck table 36 has been moved in the processing-feed direction and further when a pulse laser beam is applied to the workpiece by adjusting the output of the pulse laser beam so as to form a plurality of holes 204 by 2-D processing such as trepanning, etc. as shown in FIG. 10(a), a hole 205 having a desired size can be formed, as shown in FIG. 10(b).

Still another embodiment of laser processing by activating the second acousto-optic deflection means 82 of the above-described laser beam application means 52 will be described with reference to FIGS. 11(a) and 11(b).

That is, the workpiece W is brought to a position right below the condenser lens 92 as shown in FIG. 11(a) and moved (processing-fed) in the direction perpendicular to the sheet while a pulse laser beam is applied to the workpiece W to form a groove 206. Then, the second acousto-optic deflection means 82 of the above laser beam application means 52 is activated to deflect the optical axis of a pulse laser beam in the indexing-feed direction (Y-axis direction) as shown in FIG. 11(b) and the workpiece W is moved (processing-fed) in the direction perpendicular to the sheet while the pulse laser beam is applied thereto, thereby making it possible to form a plurality of grooves 206 in the workpiece W by only moving the workpiece W in the processing-feed direction without moving it in the indexing-feed direction. When the above groove 206 is to be formed, the first acousto-optic deflection means 81 is activated to change the output of the pulse laser beam at a predetermined position, thereby making it possible to change the depth of the groove 206 at the predetermined position.

Further, when the optical axis of the pulse laser beam is deflected for every other pulse by synchronizing a control for the absorption of the pulse laser beam oscillated by the pulse laser beam oscillation means 6 by the laser beam absorbing means 83 with the repetition frequency of the pulse laser beam without deflecting the optical axis of the pulse laser beam oscillated by the pulse laser beam oscillation means 6 by the first acousto-optic deflection means 81 of the laser beam application means 52 shown in FIG. 2, the pulse laser beam having a predetermined repetition frequency can be applied to the workpiece without changing its pulse width.

What is claimed is:

1. A laser beam processing machine comprising:
   a chuck table for holding a silicon wafer,
   a laser beam application means for applying a plurality of pulse laser beams to the silicon wafer held on the chuck table to form a through hole therein,
   a processing-feed means for moving the chuck table and the laser beam application means relative to each other in a processing-feed direction (X-axis direction), and
   an indexing-feed means for moving the chuck table and the laser beam application means relative to each other in an indexing-feed direction (Y-axis direction) perpendicular to the processing-feed direction (X-axis direction), wherein the laser beam application means comprises a laser oscillation means for oscillating a laser beam, a first acousto-optic deflection means for deflecting the optical axis of a laser beam oscillated by the laser beam oscillation means in the processing-feed direction (X-axis direction), and a second acousto-optic deflection means for deflecting the optical axis of a laser beam oscillated by the laser beam oscillation means in the indexing-feed direction (Y-axis direction), wherein the first acousto-optic deflection means or the second acousto-optic deflection means deflects the plurality of pulse laser beams such that the beams are applied to form one through hole in a portion of the silicon wafer in which a through hole is to be formed while the wafer is moving relative to the laser beam application means, wherein the first acousto-optic deflection means comprises a first acousto-optic device for deflecting the optical axis of a laser beam oscillated by the laser beam oscillation means in the processing-feed direction (X-axis direction), a first RF oscillator for applying RF to the first acousto-optic device and a first deflection angle adjusting means for adjusting the frequency of RF output from the first RF oscillator; and the second acousto-optic deflection means comprises a second acousto-optic device for deflecting the optical axis of a laser beam oscillated by the laser beam oscillation means in the indexing-feed direction (Y-axis direction), a second RF oscillator for applying RF to the second acousto-optic device, and a second deflection angle adjusting means for adjusting the frequency of RF output from the second RF oscillator, wherein the first acousto-optic deflection means comprises a first output adjusting means for adjusting the amplitude of RF output from the first RF oscillator; and the second acousto-optic deflection means comprises a second output adjusting means for adjusting the amplitude of RF output from the second RF oscillator, and wherein the laser beam processing means further comprises a processing-feed amount detection means for detecting the processing-feed amount of the chuck table relative to the laser beam application means, an indexing-feed amount detection means for detecting the indexing-feed amount of the chuck table relative to the laser beam application means, a memory means for storing the X and Y coordinate values of an area to be processed of the silicon wafer, and a control means for controlling the first acousto-optic deflection means and the second acousto-optic deflection means based on the X and Y coordinate values stored in the memory means and detection signals from the processing-feed amount detection means and the indexing-feed amount detection means.

* * * * *